United States Patent Office 3,528,963
Patented Sept. 15, 1970

3,528,963
PROCESS FOR PREPARING CELLULOSE SULFATE SALTS
Albert R. Reid, Hockessin, Del., assignor to Hercules Incorporated, Wilmington, Del., a corporation of Delaware
No Drawing. Filed Mar. 24, 1969, Ser. No. 809,965
Int. Cl. C08b 5/14
U.S. Cl. 260—215                                       7 Claims

ABSTRACT OF THE DISCLOSURE

A process for preparing alkali metal salts of cellulose sulfate in solution with an N,N-dialkylamide·$SO_3$ complex, thereafter precipitating the sulfated product by adding a non-solvent, and conducting the neutralization and purification steps with the material in particulate form. The process is an improvement over prior art processes wherein neutralization and purification are conducted in solution.

---

This invention relates to a process for the production of water-soluble alkali metal or ammonium salts of cellulose sulfate of high degree of substitution and relatively high viscosity, and the term "alkali metal salts" used hereinafter with reference to the products hereby prepared is intended to include the ammonium salts also. These salts are a relatively little known class of materials whose water solubility and gel-forming characteristics make them potentially useful in the food field as stabilizers for such foods as ice cream and chocolate milk and as a food gel generally. Commercial exploitation of these materials has, to date, been hampered by the fact that their relatively high cost makes them economically uncompetitive with other materials for similar applications.

In the best technique heretofore developed for the production of this cellulose derivative, cellulose, in the form of cotton linters, wood pulp, or other naturally occurring form is dissolved in a solution of a complex of a dialkylformamide and sulfur trioxide at low temperature to form cellulose sulfate. This sulfate is neutralized while in solution by contacting it with the calculated amount of an aqueous alkaline solution of an alkali metal or ammonium compound. Alternatively, the sulfate can be precipitated from a solution of the complex, then redissolved in water for the neutralization step. In accordance with this invention, it has been found that the substantial process improvements can be realized and a product superior in several ways, including a cheaper product, can be obtained if the excess acid removal, neutralization and product purification steps are carried out while the product is in solid, small, discrete particle form, slurried in a nonsolvent liquid. The invention, stated more explicitly, is a process for the preparation of an alkali metal cellulose sulfate comprising the following steps:

(a) steeping by slurrying cellulose in a sulfation diluent of an N,N-dialkylamide,
(b) sulfating by contacting the resulting slurry with a sulfation mixture comprising a complex of $SO_3$ and an N,N-dialkylamide, until a sulfate D.S. of 1 to 3 is attained,
(c) precipitating cellulose sulfate in the form of solid, small discrete particles from the sulfation reaction mass by adding thereto a cellulose sulfate nonsolvent,
(d) separating said particles from the excess of alkylamide, reactants and acidic by-products in the sulfation reaction mass, and slurrying them in additional cellulose sulfate nonsolvent,
(e) neutralizing the cellulose sulfate by contacting the slurried particles with an alkaline solution of an alkali metal compound in an organic medium which is a nonsolvent for the alkali metal cellulose sulfate, and
(f) recovering the slurried, neutralized particles from said nonsolvent medium.

The cellulose to be sulfated according to the process of this invention can be in any of the conventional forms, although the highest quality products are obviously prepared from the purer forms of cellulose. Thus, chemical cotton and ester grades of wood pulp are the preferred forms for forming high-grade products.

In carrying out the process of the invention, the cellulose is preferably first subjected to a treatment for swelling the cellulose particles or fibers to make them more accessible to the sulfating complex so that sulfation can be effected more quickly. This treatment usually comprises steeping the cellulose in the presence of one or more cellulose nonsolvents (e.g. boiling water, then glacial acetic acid and finally an N,N-dialkylamide) which are capable of swelling the cellulose, followed by further steeping in a diluent (e.g. an N,N-dialkylamide) in which the subsequent sulfation can be accomplished. Steeping in sulfation diluent results in saturation of the swollen cellulose with the diluent so that the sulfating reagent can reach substantially all fibers readily.

The sulfating diluent which is employed is an N,N-dialkylamide, the amide and the alkyl substituents thereon each having 1 to 3 carbon atoms. Exemplary compounds coming within this class include dimethylformamide, diethylformamide, dimethylacetamide, diethylacetamide, dimethylpropionamide and diethylpropionamide. Dimethylformamide (DMF) is preferred.

The sulfating agent which is employed to prepare cellulose sulfate is a complex of the N,N-dialkylamide of the type above disclosed and $SO_3$. This complex is a crystalline, solid material consistnig of one mole of sulfur trioxide and one to two moles of the amide. It is prepared by slowly adding liquid $SO_3$ to the N,N-dialkylamide with temperature held at about 0° C., and recovering the crystalline material wet with the amide. Alternatively, the complex can be prepared as a solution of known concentration in the amide. Here again, the preferred amide is DMF.

The crystalline, solid complex is dissolved in a further portion of the amide to carry out the reaction with cellulose. The further portion of amide can be that in which the cellulose is suspended to effect the sulfation reaction. The amount of amide should be sufficient to assure complete dissolution of the complex so that the sulfation reaction can proceed in a liquid phase.

The theoretical maximum degree of substitution (D.S.) for cellulose is about 3—i.e., there are 3 hydroxyl groups subject to $SO_3$ substitution per anhydroglucose repeating unit of cellulose. In order to prepare a water-soluble sulfated cellulose by the best prior art technique disclosed hereinbefore, the D.S. must be at least about 1. Usually in order to assure attainment of this minimum D.S., the molar ratio of $SO_3$ to cellulose at the start of the sulfation should be at least about 3 to 1, which is an excess of $SO_3$ over that theoretically required for a D.S. of 1.0. While there is no required upper limit, an excess greater than about 4 to 1 would be economically undesirable. The most desirable product is usually that with a D.S. of about 2.0 to 2.5, and this requires an $SO_3$ to cellulose molar ratio of about 4 to 1.

The sulfation reaction is carried out at low temperatures, i.e., between about 0 and 25° C., preferably between 0 and 15° C. Generally sulfation is essentially finished within about three hours or less, depending on the temperature used.

It is desirable that the sulfation reaction be carried out under substantially anhydrous conditions. There is a competing reaction which takes place between the amide—$SO_3$ complex and water wherein water consumes about 4.5 times its own weight of $SO_3$, forming sulfuric acid, so that even traces of water in the reaction environment can lead to a very substantial reduction in sulfate D.S. For example, if the amide employed as reaction medium contains even only about 1% water, the D.S. of the product can be decreased from about 2.0 to 0.8. This difficulty can be overcome to some extent by increasing the amount of the complex employed, but this is expensive. Moreover, it has also been found that sulfation in the presence of too much water can lead to products with low solution viscosity.

The reaction mixture of sulfated cellulose in the N,N-dialkylamide is a stirrable viscous solution or gel. To this is added, with agitation, a polar organic liquid which is a nonsolvent for the cellulose sulfate and its alkali metal salts, but which will dissolve any sulfuric acid resulting from the reaction, residual $SO_3$ and the amide. Useful nonsolvents include e.g. ketones such as acetone, methyl ethyl ketone, or diethyl ketone, alcohols such as methanol, ethanol, isopropanol, or butanol, and ethers such as diethyl ether, methyl ethyl ether, dioxane, or tetrahydrofuran. The nonsolvent precipitates the sulfated cellulose in solid, small, discrete particle form while dissolving the $SO_3$, amide, and $H_2SO_4$ present in the reaction mass, thus preventing these materials from being occluded in the product as impurities. The particles are separated and washed again with nonsolvent to remove substantially all residual $SO_3$, $H_2SO_4$, sulfating diluent, etc., then resuspended in additional nonsolvent. In order to minimize any tendency of degradation of the cellulose sulfate, preferably the precipitation and washing steps will be carried out at about 0° C. to 25° C. more preferably 0° C. to 15° C. Absence of such acidic impurities also facilitates neutralization, requiring less alkali and resulting in very small quantities of free sodium sulfate in the neutralized slurry. (Sodium sulfate is difficult to remove from the product in later washing steps.)

The sulfated cellulose is then converted from its free acid form to the alkali metal salt by neutralizing with an alkaline alkali metal reagent. Such compounds e.g. as sodium, potassium or ammonium hydroxide, sodium carbonate, sodium acetate, potassium carbonate, potassium bicarbonate, or sodium bicarbonate are useful in this step. The neutralizing reagent (e.g. sodium acetate) is in solution in an organic medium (e.g. acetone-methanol mixture) of the type employed in the precipitation. It will be understood that when the neutralizing reagent used is less soluble in the organic medium used than sodium acetate, in order to facilitate dissolving the neutralizing reagent small amounts of water can be employed but of course the amount of water will be less than that which will dissolve the product and preferably even less than that which will swell the product. The neutralized cellulose sulfate is then washed thoroughly with a nonsolvent therefor e.g. aqueous alcohol or acetone), separated from excess nonsolvent and recovered.

The method of this invention has several advantages over the solution method which was the preferred method known to the prior art. For one, it avoids the use of highly viscous solutions in the latter phases of the process when neutralization and purification are being carried out. Additionally, the precipitation method results in products of much higher purity, as explained hereinabove.

Avoidance of large amounts of water throughout the process is also advantageous. In order to effect the highest possible D.S. on the cellulose, an excess of $SO_3$ is required in the reaction mass. When the reaction mass is dissolved in water as in the prior art solution process, this $SO_3$ forms sulfuric acid. To neutralize this excess $H_2SO_4$ requires relatively large amounts of the alkaline neutralizing agent. This in turn results in formation of large amounts of water-soluble alkali metal sulfates which are difficult to remove from the water-soluble alkali metal cellulose sulfate by washing with alcohol or even with aqueous alcohols. The alkali metal to sulfur molar ratio in the alkali metal cellulose sulfate product is a measure of the purity of the product. In order to give a product in accordance with the present invention the molar ratio of alkali metal to sulfur should be at least as low as about 1.05/1 and preferably as near 1/1 as possible. It is also found that a significant amount of the N,N-dialkylamide is also entrapped in particles which have been prepared by the water solution process heretofore used, but this is not the case with the material prepared according to this invention.

One other collateral benefit realized from the process of this invention is the ease of recovery of the amide employed in the sulfation reaction. In the prior methods, this material becomes diluted with large volumes of water and methanol which must be removed before the amide can be reused. Separation from acetone or alcohol as in this process is substantially easier.

The invention is illustrated in the following examples. In the examples and elsewhere herein parts and percentages are by weight unless otherwise indicated.

EXAMPLE 1

Purified cotton linters were boiled in distilled water (60 ml. $H_2O$/gram cotton) for one hour, washed with 50 ml. of isopropanol per gram of cotton, then with 30 ml. of technical grade dimethylformamide (DMF) per gram of cotton, and then transferred to 30 ml. of distilled anhydrous DMF per gram of cotton. The cotton was allowed to steep in the DMF for 20 hours at 0° C. to 5° C. At the end of the 20 hour period, excess steeping liquid was removed and the steeped cellulose was pressed to about three times its original weight by vacuum filtration. The pressed cellulose was transferred to a reaction vessel and anhydrous DMF was added in the amount of about 12 to 13 ml./g. of cellulose. DMF-$SO_3$ complex containing 49.5% $SO_3$ dissolved in anhydrous DMF was added in three equal aliquots to give a final total DMF content of 33 ml./gram of cellulose and an $SO_3$/cellulose molar ratio of 4/1. The mass was reacted with continued agitation for three hours with the temperature held between 0° C. and 5° C.

At the end of three hours, a very viscous, but stirrable mass had formed. With agitation still continuing, cold acetone was added slowly to precipitate the sulfated cellulose as fine particles. The product was isolated by filtration and washed several times with cold acetone. The washed product was suspended in a cold 50/50 (v./v.) acetone-methanol mixture containing 1.25 grams of sodium acetate and 2.0 grams of water per 100 ml. of the mixture. This was agitated for about 15 to 30 minutes to effect neutralization. The product was again filtered off and washed with 95% methanol to a fine slurry pH of 8.2, then dried in vacuo for four hours.

Per gram of original cellulose, the reaction yielded 2.5 grams of sodium cellulose sulfate (SCS) having a D.S. of about 2. Molar ratio of sodium to sulfur in the product was 1.03, which indicates that substantially all sodium sulfate was removed during washing which in turn indicates that substantially all excess acidic by-products were removed prior to the neutralization (i.e. during the organic medium washing step). A 2% by weight solution of this material was slightly hazy with a few undissolved fibers, and had a Brookfield solution viscosity of 640 c.p.s. at 25° C. (#3 spindle at 30 r.p.m.).

EXAMPLE 2

Chemical cotton was pretreated by boiling for one hour in 60 ml. of distilled water per gram of cotton, swelling by steeping three times in glacial acetic acid (30 ml./gm. of cellulose for 15 minutes). The cellulose was then washed with anhydrous DMF to displace acetic acid and steeped for 20 hours at 0° C. to 5° C. in 30 ml. of distilled anhydrous DMF per gram of cotton.

This material was sulfated, washed and neutralized as set forth in Example 1 and about 2.8 parts of SCS per part of cellulose were recovered having a D.S. of about 2.3. A 1% solution of this material in water was hazy with some undissolved fibers and had a Brookfield viscosity of 170 cps. at 25° C. (#2 spindle, 30 r.p.m.). Sodium to sulfur molar ratio was 1.03.

EXAMPLE 3

Fine particle wood pulp was slurried in 30 ml. of anhydrous distilled DMF per gram of pulp at 0° C. to 5° C. for about 20 hours. The excess DMF was removed by suction filtration and the pulp was sulfated, washed and neutralized in the manner previously described in Example 1.

The sulfated product (2.7 grams/g. of cellulose furnish) had a D.S. of 2.0. Its 2% solution in water was clear with substantially no undissolved fibers visible. The viscosity of the 2% solution was 420 cps. at 25° C. (#3 spindle, 30 r.p.m.). Sodium to sulfur molar ratio was about 0.98.

EXAMPLE 4

Example 3 was repeated except that in the pretreatment the woodpulp was boiled in 60 ml. of distilled water per gram of pulp, then washed with DMF prior to steeping in DMF.

The D.S. of this product was 2.5 and its 2% water solution viscosity was 200 c.p.s. at 25° C. (#3 spindle, 30 r.p.m.). The solution was quite clear with substantially no undissolved fibers. The sodium to sulfur ratio was 1.00, again indicating no sodium sulfate impurity in product. The nitrogen content of the SCS, corrected for .02% nitrogen originally in the wood pulp was 0.02%, indicating very little DMF impurity in the product.

EXAMPLE 5

Example 2 was repeated using wood pulp in place of chemical cotton. The D.S. was 2.2. The 2% aqueous solution was clear, having viscosity of 280 c.p.s. at 25° C. (#3 spindle 30 r.p.m.). The sodium to sulfur ratio was 1.01 and the nitrogen content was 0.01 (.02% in the wood pulp) indicating substantially no amide in the product.

EXAMPLE 6

Wood pulp was sulfated as described in the previous Examples 3–5 except that the molar ratio of $SO_3$ to cellulose was 3/1 instead of 4/1. The D.S. of this product was 1.1 and productivity of the reaction was 1.6 grams/gram of cellulose raw material. Its 2% solution viscosity was 690 c.p.s. at 25° C. (#3 spindle, 30 r.p.m.). Its sodium to sulfur molar ratio was 1.03.

What I claim and desire to protect by Letters Patent is:
1. Process for preparing an alkali metal salt of cellulose sulfate which comprises:
(a) steeping by slurrying cellulose in a sulfation diluent of an N,N-dialkylamide whose amide and alkyl groups each have 1 to 3 carbon atoms,
(b) sulfating by contacting the slurry with a complex of sulfur trioxide with an N,N-dialkylamide described in (a) until a sulfate degree of substitution of about 1 to 3 is attained,
(c) precipitating cellulose sulfate in the form of solid, small, discrete particles from the sulfation reaction mass by adding thereto polar organic liquid nonsolvent for the cellulose sulfate and its alkali metal salts,
(d) separating said particles from the excess of amide, reactants and acidic by-products in the sulfation reaction mass and slurrying said particles in additional polar organic liquid nonsolvent described in (c),
(e) neutralizing the cellulose sulfate and forming the alkali metal salt thereof by contacting it with a solution of an alkaline alkali metal reagent in an organic medium which is a nonsolvent for the alkali metal cellulose sulfate, and
(f) recovering said particles of alkali metal cellulose sulfate from said nonsolvent medium.

2. Process of claim 1 wherein the alkaline alkali metal reagent employed in step (e) is a sodium compound.

3. Process of claim 1 wherein the alkaline alkali metal reagent employed in step (e) is sodium hydroxide.

4. Process of claim 1 wherein the cellulose sulfate nonsolvent employed in steps (c) and (d) is a ketone.

5. Process of claim 1 wherein the cellulose sulfate nonsolvent employed in steps (c) and (d) is an alcohol.

6. Process for preparing sodium cellulose sulfate which comprises:
(a) steeping by slurrying cellulose in a sulfation diluent of dimethylformamide,
(b) sulfating by contacting the slurry with a complex of sulfur trioxide with dimethylformamide until a sulfate degree of substitution of about 1 to 3 is attained,
(c) precipitating cellulose sulfate in the form of solid, small, discrete particles from the sulfation reaction mass by adding thereto polar organic liquid nonsolvent for the cellulose sulfate and its alkali metal salts,
(d) separating said particles from the excess of reactants, amide and acidic by-products in the sulfation reaction mass and slurrying said particles in additional polar organic liquid nonsolvent described in (c),
(e) neutralizing the cellulose sulfate and forming the sodium salt thereof by contacting it with a solution of an alkaline sodium salt in an organic medium which is a nonsolvent for the sodium cellulose sulfate, and
(f) recovering said particles of sodium cellulose sulfate from said nonsolvent medium.

7. The process of claim 6 wherein the alkaline sodium salt employed in step (e) is sodium acetate.

References Cited

UNITED STATES PATENTS

| | | | |
|---|---|---|---|
| 2,697,093 | 12/1954 | Jones | 260—215 |
| 3,070,595 | 12/1962 | Petracek et al. | 260—233.5 |
| 3,077,373 | 2/1963 | Kerr | 260—233.5 |
| 3,174,904 | 3/1965 | Sawhill | 260—215 |
| 3,200,110 | 8/1965 | Gollin et al. | 260—210 |
| 3,368,484 | 2/1968 | Fairchild | 260—215 |

DONALD E. CZAJA, Primary Examiner

R. W. GRIFFIN, Assistant Examiner

U.S. Cl. X.R.

99—24, 139; 162—82